US012670787B2

(12) United States Patent
Jean et al.

(10) Patent No.: US 12,670,787 B2
(45) Date of Patent: Jun. 30, 2026

(54) SCHOOL BUS SENSING TRAFFIC LIGHT CHANGER

(71) Applicants: Eliana Elizabeth Jean, Bryn Mawr, PA (US); Nathaniel Alexander Jean, Bryn Mawr, PA (US)

(72) Inventors: Eliana Elizabeth Jean, Bryn Mawr, PA (US); Nathaniel Alexander Jean, Bryn Mawr, PA (US)

( * ) Notice: Subject to any disclaimer, the term of this patent is extended or adjusted under 35 U.S.C. 154(b) by 15 days.

(21) Appl. No.: 18/808,003

(22) Filed: Aug. 18, 2024

(65) Prior Publication Data

US 2026/0051245 A1      Feb. 19, 2026

(51) Int. Cl.
*G08G 1/087*      (2006.01)
*G08G 1/005*      (2006.01)
*G08G 1/095*      (2006.01)
*H04W 4/42*      (2018.01)

(52) U.S. Cl.
CPC ............. *G08G 1/087* (2013.01); *G08G 1/005* (2013.01); *G08G 1/095* (2013.01); *H04W 4/42* (2018.02)

(58) Field of Classification Search
None
See application file for complete search history.

(56) References Cited

U.S. PATENT DOCUMENTS

2021/0201664 A1*   7/2021   McQuillen ............. G08G 1/091

* cited by examiner

*Primary Examiner* — John F Mortell

(57)      ABSTRACT

A school bus sensing traffic light changer designed to ensure the safety of students entering or exiting a school bus at an intersection. When a school bus stops at a traffic light, the driver can activate a control panel on the dashboard to send a wireless signal from a signaling device mounted on the bus roof. This signal is received by a sensor on the traffic light, which then interfaces with the traffic signal control panel to change all traffic lights at the intersection to red and cross-walk signals to walk. The control panels are connected through communication wires to facilitate this process. A visual indicator on the sensor confirms the signal reception, ensuring that the lights change accordingly. Once the students have safely crossed, the driver can deactivate the signal, allowing the traffic lights to return to their normal operation.

3 Claims, 3 Drawing Sheets

SCHOOL BUS SENSING TRAFFIC LIGHT CHANGER

CROSS-REFERENCE TO RELATED APPLICATIONS

Provisional Utility Patent Application No. 63/580,381
Filing Date Sep. 3, 2023

STATEMENT REGARDING FEDERALLY SPONSORED RESEARCH OR DEVELOPMENT

Not Applicable

REFERENCE TO A "SEQUENCE LISTING"

Not Applicable

BACKGROUND OF THE INVENTION

More than 500,000 school buses are used for public school transportation in the United States alone. These buses transport 26 million children to and from school and are responsible for the safety of students aboard. The most dangerous part of the school bus ride occurs when students get on and off the bus. Accidental student fatalities caused by vehicles passing stopped school buses represent a critical and persistent safety concern that affects communities globally. Despite stringent regulations mandating drivers to halt when school buses display their stop signs, statistics reveal a troubling reality. In the United States alone, an estimated 242,000 vehicles illegally pass school buses daily, as the National Association of State Directors of Pupil Transportation Services (NASDPTS) reports. In the NASDPTS 2023 Stop-Arm survey, 94,581 school bus drivers reported that 62,482 vehicles passed their buses illegally daily during the 2022-23 school year. Overall, more than 15 million cars illegally pass school bus stop paddles yearly.

Currently, the system that alerts drivers of a stopped school bus typically involves a mechanical paddle with a stop sign mechanism mounted on the side of the bus. When the school bus comes to a stop to load or unload students, the bus driver extends the stop sign paddle into the roadway. This method of using a mechanical paddle with a stop sign and flashing lights on school buses, while generally effective, can prove inadequate in preventing accidents where vehicles illegally pass stopped buses. One significant challenge lies in visibility issues, particularly during adverse weather conditions such as heavy rain, fog, or snow, which can obscure the visibility of the stop sign for approaching drivers. Additionally, driver distraction poses a serious risk; drivers may be preoccupied with phones, passengers, or other distractions, delaying their recognition of the stopped bus and compliance with the stop signal. The speed at which vehicles approach and variations in road layout further complicate matters, as drivers may have insufficient time or space to react appropriately. In addition, in urban settings where school buses must stop on roads with multiple lanes, vehicle drivers driving across multiple lanes of traffic could be unaware of the mechanical school bus stop sign and not stop to allow children to safely cross the road. In these multiple lane roads, without all lanes of traffic stopped, students will be unable to safely cross the street to enter and exit the bus. Addressing these challenges requires advancements in technology, like those presented in this invention.

The widespread issues with the current stopped school bus alert signs have devastating consequences; between 2008 and 2017, 264 school-age children tragically lost their lives in school transportation-related crashes, with a significant number attributed to passing vehicles. From 2011 to 2020, a total of 218 school-age children (18 and younger) died in school-bus-related crashes. In Pennsylvania alone in the past year (2022-2023), 23 students have been injured due to vehicles illegally passing school buses. Beyond the immediate toll on lives, incidents involving vehicles passing stopped school buses have profound impacts on families, communities, and the educational system. Families endure devastating loss and long-term grief, while communities mourn the promising futures cut short and face shaken trust in safety measures. Within schools, these tragedies disrupt learning environments and necessitate heightened safety protocols and grief support for students and staff. Addressing these challenges requires comprehensive strategies to prioritize student safety and foster a culture of responsibility among drivers and the community.

The challenge of ensuring student safety while at school bus stops underscores the urgent need for innovative, proactive solutions to mitigate risks and enhance student safety during one of the most vulnerable times in their daily routine—getting on and off the school bus.

BRIEF SUMMARY OF THE INVENTION

The objective of this invention is to improve the safety of school buses and school children by eliminating the threat of unobservant drivers illegally passing a stopped school bus at an intersection and inadvertently hitting students. The system will work through the communication of a signaling device on a school bus that connects to sensors on the traffic lights so that when the school bus driver approaches an intersection with an impending stop, they will turn on the signaling device which interfaces with the traffic lights to cause all four intersection traffic lights turn yellow and then red, and all pedestrian crosswalk signs to walk. This will ensure that drivers perceive the stopped school bus ahead and give drivers adequate time to slow to a stop allowing school children to safely enter and exit the bus.

More specifically, the system works by performing the following actions. First, the signaling device on the school bus turns on when the bus driver activates the signaling device before an impending stop at the intersection. The receiving sensor on the traffic light will flash to ensure the driver is aware that the signal has been received. The school bus signaling device communicates with the sensor on the traffic lights, so all four lights at the intersection change to yellow and then red. When the school bus comes to a complete stop and bus lights turn red, traffic lights remain red. All pedestrian crosswalk signals turn to walk, allowing for children on other sides of the street to safely cross to the bus. When school bus doors have closed and flashing bus lights have stopped, then the driver deactivates the signaling device, and intersection lights resume their previous traffic pattern.

The system offers several significant advantages that enhance safety and efficiency at bus stops located in busy intersections. Firstly, it improves the safety of these bus stops by ensuring that drivers do not pass a stopped school bus. This crucial feature helps protect children from the dangers posed by inattentive or reckless drivers. Additionally, the system allows children to safely cross the street from all directions while the bus is stopped, creating a safer environment for students embarking or disembarking from the bus.

Moreover, the system reduces driver stress and the possibility of car accidents by making it easier for drivers to see when a bus is stopped ahead. This clear indication helps drivers to react appropriately and promptly, preventing potential accidents. In addition, the visual signal of the walk sign at the intersection signals a safe time and location for students to cross within existing crosswalks. By ensuring that children can board the school bus without the threat of cars driving by and endangering them, the system significantly enhances the overall safety of school bus operations. This comprehensive approach not only prioritizes the well-being of children but also fosters a more organized and secure traffic environment around school buses.

Current systems used by school buses to alert other drivers of a stop are outdated, having been the standard for nearly 80 years. The current systems have no integration with the surrounding traffic systems and are only located on the bus itself. This makes it much easier for drivers to overlook the warning on the bus and drive by the stopped vehicle, endangering students getting on and off. This new system integrates the school bus' current alert system with the surrounding traffic lights, using a signaling device located on the school bus and a sensor on the traffic light. This helps other vehicles notice the stopped school bus, prompting them to stop and allow the children to enter or exit the bus safely.

DETAILED DESCRIPTION OF THE INVENTION

Although this disclosure is detailed and precise to enable skilled practitioners to implement the invention, the physical embodiments provided are merely examples. The invention can be embodied in other specific structures. While the preferred embodiment has been described, the details can be altered without departing from the scope of the invention, which is defined by the claims.

Figures 1, 2:
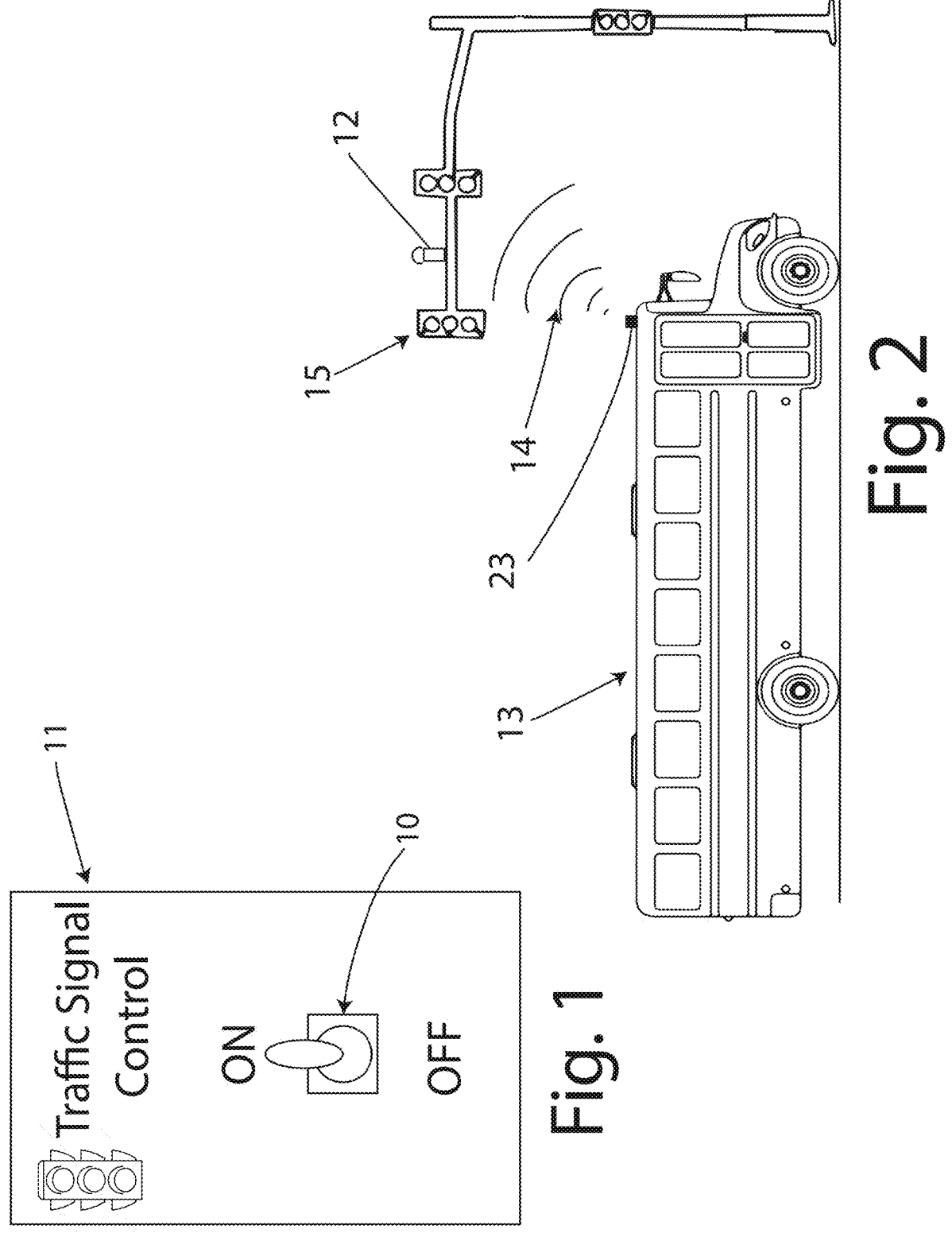
FIG. 1 illustrates a front view of the control panel for the traffic light changing signal emitted from the school bus.
FIG. 2 displays a side view of a school bus stopped at a traffic light and the interaction between the wireless signaling device from the school bus and the receiving sensor on the traffic light.

The function of the proposed invention is displayed in FIG. 2 where a school bus, designated generally as 13, is stopped at a traffic light 15. The signaling device 23 mounted on the roof of the school bus sends a wireless signal 14, which could be in the form of infrared signals, radio transmissions, cellular, GPS, or other wireless signals. The signaling device 23 has a predetermined receiving range and is known in the art. This signal interfaces with the sensor 12 mounted on the traffic light. The sensor 12 has a predetermined receiving range and is known in the art. This attachment between the sensor receiving the signal and the traffic light can be formed either as represented in FIG. 2 or FIG. 3.

Figures 3, 4:
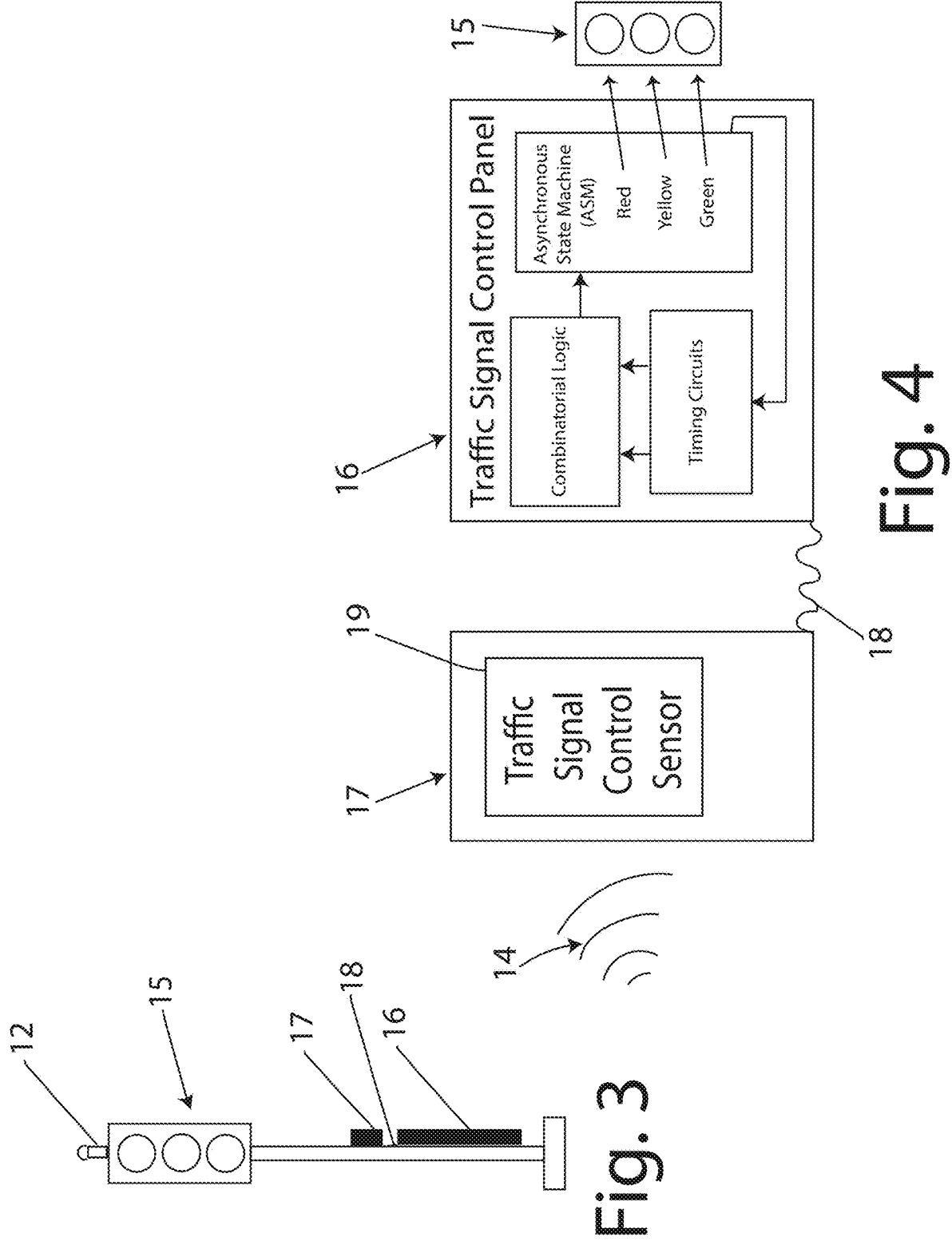
FIG. 3 depicts a potential installation of the receiving sensor and accompanying control box on a standard traffic light.
FIG. 4 shows the interface between the invention's traffic signal control sensor and the standard traffic light control boxes.

Referring to FIG. 4, once the wireless signal 14 from the signaling device 23 has been received by the sensor 12, there is an interface with the traffic signal control sensor 19 which is located in a control panel box 17. This control panel 17 for the traffic signal control sensor 19 is connected to the main traffic light control panel 16, a standard in all traffic lights, by a communication/electrical wire 18. The traffic signal control sensor 19 interfaces with the timing circuits located in control panel 16 to cause new combinatorial logic which then turns all traffic lights 15 at an intersection to yellow and then red per the standard timing protocol. Once the signal from the sensor 12 located on the traffic light 15 is no longer received because the signaling device 23 is turned off, both the traffic light 15 and the crosswalk signs 21 will resume their normal traffic control functions as programmed by control panel 16.

FIG. 3 shows the preferred mounting of the two control panels 16, 17 on the side of the traffic light 15. The control panel for the traffic signal control sensor 17 can be mounted above the standard traffic light control panel 16 and connected together through interface 18.

As displayed in FIG. 1, the transmission of the wireless signal 14 is controlled by a control panel 11 located on the dashboard of the school bus. When the school bus driver approaches an intersection and would like the traffic lights to turn red to ensure student safety, they can flip the switch 10 from off to on to start the wireless transmission of the traffic light changing signal 14. When all students have either safely entered or exited the bus, the driver can flip the switch 10 to off, ending the transmission of the wireless traffic light changing signal 14.

Figure 5:
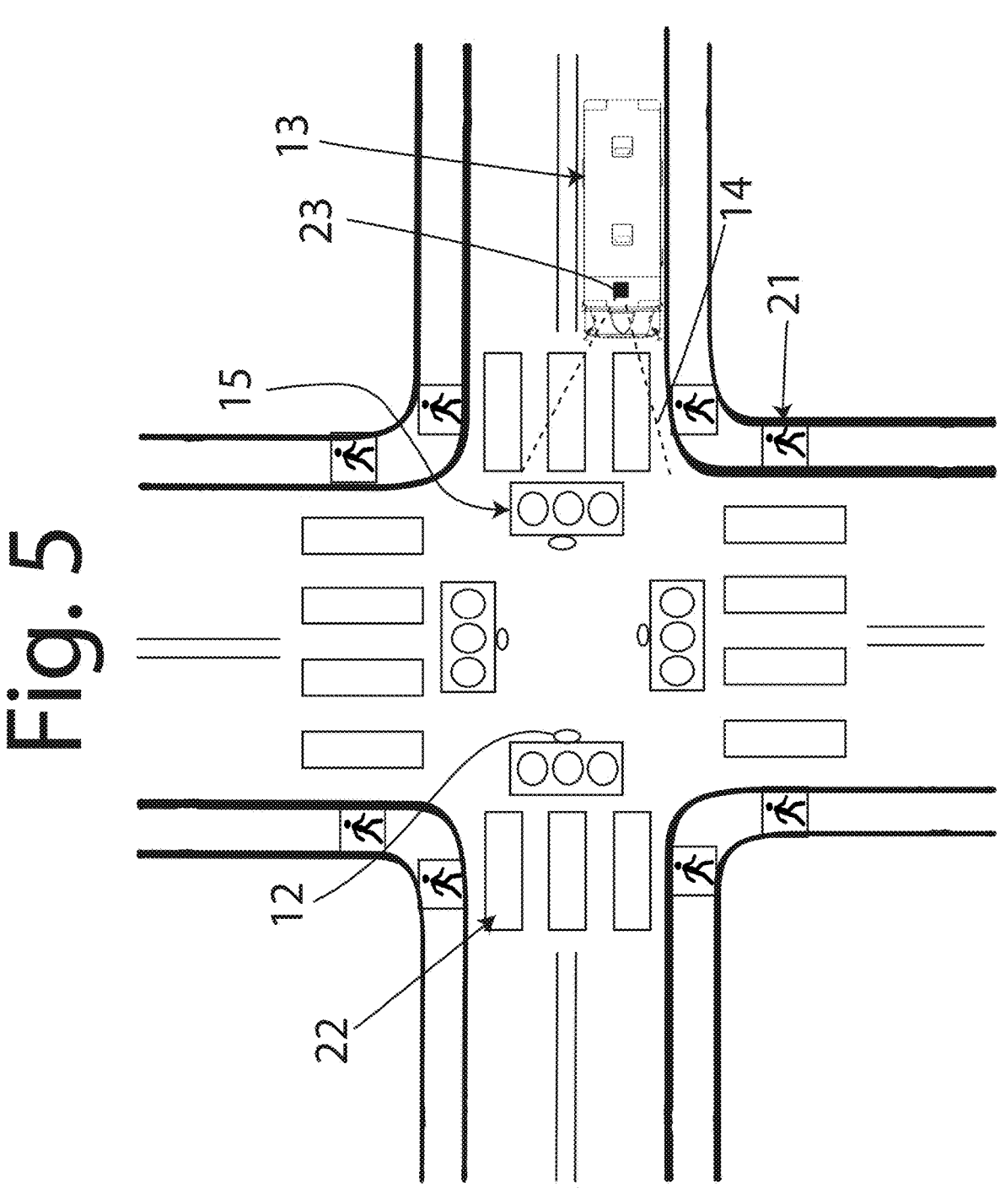
FIG. 5 illustrates an overhead view of a school bus stop in a 4-way intersection equipped with school bus sensors on the traffic lights according to the proposed invention.

The general purpose and embodiment of the invention is represented in FIG. 5 which illustrates an overhead view of a 4-way intersection. A school bus 13 is stopped at the traffic light 15. When the school bus stops, and the driver activates the traffic signal control 11, the wireless signal 14 interfaces with the sensor 12 mounted on the traffic light 15. This causes all four traffic lights 15 to change to yellow and then red, and all crosswalk signs 21 to change to walk. The sensor 12 has a visual light display which indicates that the sensor has received the transmission signal. These functions allow students to safely cross the intersection using the crosswalks 22.

In summary, the invention works by a school bus driver activating the traffic signal control 11 by flipping the switch 10 when the school bus 13 is stopped at an intersection. The traffic signal control 11 prompts the signaling device 23 located on the roof of the school bus 13 to transmit a wireless signal 14. This wireless signal 14 is received by the sensor 12 located on the traffic light 15. Once the signal 14 is received by the sensor 12, there is a visual indicator on the sensor. Then, the control panel 17 housing the traffic signal control sensor 19 interfaces with the traffic light control panel 16 to change all four of the traffic lights 15 in the intersection to red and all of the crosswalks 21 to walk. Once all the students have safely entered or exited the school bus, the driver flips the traffic signal control switch 10 to off, ending the transmission of the wireless signal 14 and stopping the visual indicator on sensor 12. The traffic light 15 resumes its normal traffic pattern function.

The above drawings are intended merely as an illustration of the principles of the invention. Additionally, since numerous modifications and changes will readily occur to those skilled in the art, it is not desired to limit the invention to the precise construction and operation shown and described. While the preferred embodiment has been detailed, the specifics may be altered without departing from the invention, which is defined by the claims.

What is claimed is:

1. A school bus sensing traffic light changing system which is comprised of:

a signaling device/transmitter located on the school bus that transmits a wireless signal including infrared, radio, cellular, GPS, and other wireless signaling methods, wherein said signaling device/transmitter is configured to be activated manually by a bus driver via a dedicated control switch when the school bus approaches an intersection; wherein when the signaling device/transmitter is activated, the signaling device/transmitter transmits a wireless traffic light changing signal;

one or more receiving sensors;

one or more traffic lights at the intersection approached by the school bus, wherein each such traffic light is mounted on a traffic light pole, wherein each such traffic light has one of the one or more receiving sensors mounted on it or on the traffic light pole, and wherein each of the receiving sensors receives the wireless traffic light changing signal;

one or more traffic signal control panels, wherein each of the one or more traffic lights is electrically connected to one of the one or more traffic control panels;

one or more traffic signal changer control panels, each being separate from the one or more traffic signal control panels, wherein each of the one or more traffic signal changer control panels comprises a signal reception and processing device, wherein each of the receiving sensors is electrically coupled to one of the one or more traffic signal changer control panels, and wherein each traffic control panel is electrically connected to one of the one or more traffic signal changer control panels;

wherein each of the one or more traffic signal changer control panels comprises bidirectional electrical signal interface and each of the one or more traffic signal control panels comprises a bidirectional electrical signal interface;

wherein after each of the one or more receiving sensors receives the wireless traffic light changing signal, each of the one or more traffic signal changer control panels communicates signal information via its bidirectional electrical signal interface to the bidirectional electrical signal interface of one of the one or more traffic signal control panels;

wherein in response to receiving the signal information, each of the one or more traffic signal control panels overrides pre-existing traffic light patterns such that all traffic lights at the intersection simultaneously turn yellow and then red, and all pedestrian crosswalk signals at the intersection simultaneously display 'walk'.

2. The system of claim 1, wherein each receiving sensor comprises a visual indicator that provides a visual indication of the receipt of the wireless traffic light changing signal and the overriding of the pre-existing traffic light patterns, thereby establishing a safety feedback loop that provides confirmation of the receipt of the wireless traffic light changing signal and the overriding of the pre-existing traffic light patterns prior to an opening a bus door.

3. The system of claim 1, wherein the system automatically restores the intersection's pre-existing traffic light patterns when the bus driver deactivates the signaling device/transmitter via the dedicated control switch.

* * * * *